(12) United States Patent
Misra et al.

(10) Patent No.: US 8,198,794 B2
(45) Date of Patent: Jun. 12, 2012

(54) DEVICE HAVING ALIGNED CARBON NANOTUBE

(75) Inventors: Devi Shanker Misra, Mumbai (IN); Kiran Shankar Hazra, Mumbai (IN)

(73) Assignee: Indian Institute of Technology Bombay, Maharashtra (IN)

( * ) Notice: Subject to any disclaimer, the term of this patent is extended or adjusted under 35 U.S.C. 154(b) by 0 days.

(21) Appl. No.: 12/842,020

(22) Filed: Jul. 22, 2010

(65) Prior Publication Data

US 2012/0019122 A1     Jan. 26, 2012

(51) Int. Cl.
*H01J 1/62* (2006.01)
*H01J 63/04* (2006.01)
*H01J 9/02* (2006.01)

(52) U.S. Cl. ........ 313/310; 313/483; 313/495; 313/496; 313/497

(58) Field of Classification Search .................. None
See application file for complete search history.

(56) References Cited

U.S. PATENT DOCUMENTS

2008/0018228 A1*    1/2008   Choi et al. .................... 313/497

OTHER PUBLICATIONS

Rinzler et al., Unraveling Nanotubes: Field Emission from an Atomic Wire, Science, New Series, Sep. 15, 1995, vol. 269, No. 5230, pp. 1550-1553.
De Heer et al., A Carbon Nanotube Field-Emission Electron Source, Science, New Series, Nov. 17, 1995, vol. 270, No. 5239, pp. 1179-1180.
Wang et al., Field Emission from Nanotube Bundle Emitters at Low Fields, Applied Physics Letters, Jun. 16, 1997, vol. 70, No. 24, pp. 3308-3310.
Tans et al., Individual Single-Wall Carbon Nanotubes as Quantum Wires, Letters to Nature, Apr. 3, 1997, vol. 386, pp. 474-477.
Bockrath et al., Single-Electron Transport in Ropes of Carbon Nanotubes, Science 275, Mar. 28, 1997, pp. 1922-1925.
Tans et al., Room-Tempurature Transistor Based on a Single Carbon Nanotube, Letters to Nature, May 7, 1998, vol. 393, pp. 49-52.
Martel et al., Single- and Multi-Wall Carbon Nanotube Field-Effect Transistors, Applied Physics Letters, Oct. 26, 1998, vol. 73, No. 17, pp. 2447-2449.
Yao et al., Carbon Nanotube Intramolecular Junctions, Letters to Nature, Nov. 18, 1999, vol. 402, pp. 273-276.
Fuhrer et al., Crossed Nanotube Junctions, Science 288, Apr. 21, 2000, pp. 494-497.
Bachtold et al., Aharonov-Bohm Oscillations in Carbon Nanotubes, Letters to Nature, Feb. 25, 1999, vol. 397, pp. 673-675.
Tsukagoshi et al., Coherent Transport of Electron Spin in a Ferromagnetically Contacted Carbon Nanotube, Letters to Nature, Oct. 7, 1999, vol. 401, pp. 572-574.
Treacy et al., Exceptionally High Young's Modulus Observed for Individual Carbon Nanotubes, Letters to Nature, Jun. 20, 1996, vol. 381, pp. 678-680.
Gomez-Navarro et al., Tuning the Conductance of Single-Walled Carbon Nanotube by Ion Irradiation in the Anderson Localization Regime, Nature Materials, Jul. 2005, vol. 4, pp. 534-539.
Rai et al., Nanotip Formation on a Carbon Nanotube Pillar Array for Field Emission Application, Applied Physics Letters, 2008, vol. 93, pp. 131921-1 to 131911-3.

(Continued)

*Primary Examiner* — Natalie Walford
(74) *Attorney, Agent, or Firm* — Knobbe, Martens, Olson & Bear, LLP

(57) ABSTRACT

A method comprising patterning a substrate to form exposed regions of the substrate sized to deter entangled growth of carbon nanotubes thereon and growing vertically aligned nanotubes on the exposed regions of the substrate.

20 Claims, 4 Drawing Sheets

OTHER PUBLICATIONS

Meunier et al., Energetics of Bent Carbon Nanotubes, Physical Review B, Jan. 15, 1998, vol. 57, No. 4, pp. 2586-2591.

Menon et al., Carbon Nanotube "T Junctions": Nanoscale Metal-Semiconductor-Metal Contact Devices, Physical Review Letters, Dec. 1, 1997, vol. 79, No. 22, pp. 4453-4456.

Rao et al., In Situ-Grown Carbon Nanotube Array With Excellent Field Emission Characteristics, Applied Physics Letters, Jun. 19, 2000, vol. 76, No. 25, pp. 3813-3815.

Murakami et al., Field Emission from Well-Aligned, Patterned, Carbon Nanotube Emitters, Applied Physics Letters, Mar. 27, 2000, vol. 76, No. 13, pp. 1776-1778.

Saito et al., Conical Beams from Open Nanotubes, Nature, Oct. 9, 1997, vol. 389, pp. 554-555.

Bonard et al., Field Emission of individual Carbon Nanotubes in the Scanning Electron Microscope, Physical Review Letters, Nov. 4, 2002, vol. 89, No. 19, pp. 197602-1 to 197602-4.

Minoux et al., Achieving High-Current Carbon Nanotube Emitters, Nano Letters, Oct. 25, 2005, vol. 5, No. 11, pp. 2135-2138.

Hayashi et al., Magnetic Thin Films of Cobalt Nanocrystals Encapsulated in Graphite-Like Carbon, Letters to Nature, Jun. 27, 1996, vol. 381, pp. 772-774.

Dai et al., Nanotubes as Nanoprobes in Scanning Probe Microscopy, Nature, Nov. 14, 1996, vol. 384, pp. 147-150.

Fan et al., Self-Oriented Regular Arrays of Carbon Nanotubes and Their Field Emission Properties, Science, Jan. 22, 1999, vol. 283, pp. 512-514.

Chattopadhyay et al., Nanotips: Growth, Model, and Applications, Critical Reviews in Solid State and Materials Sciences, Aug. 2006, vol. 31, Issue 1 & 2, pp. 15-53.

Chai et al., Focused-Ion-Beam Assisted Fabrication of individual Multiwall Carbon Nanotube Field Emitter, Carbon 43, May 10, 2005, pp. 2083-2087.

Milne et al., Carbon Nanotubes as Field Emission Sources, Journal of Materials Chemistry, Feb. 23, 2004.

\* cited by examiner

DEVICE HAVING ALIGNED CARBON NANOTUBE

BACKGROUND

Carbon nanotubes (CNTs) are tubules of narrow diameter (typically 1-100 nm) made of carbon atoms. CNT's have shown huge potential for applications with distinctive electrical and mechanical properties. The devices based on CNTs are feasible due to their superior material properties. These properties include high aspect ratio, high mechanical strength, chemical stability, and high electrical conductivity. Single wall nanotubes (SWNTS) can be either metallic or semiconducting. Individual SWNT can be used as interconnects as well as a field effect transistor. Combinations of nanotubes can be fabricated as rectifiers or more complex multidimensional structures. Further, the atomic structure of CNTs is associated with high mechanical stiffness as well as great flexibility. For example, carbon nanotubes may be 100 times stronger than steel while their weight is one sixth as much. CNTs have a Young's Modulus of 1.8 TPa and resist deformation remarkably well. Additionally, the CNTs regain their cylindrical and straight shape once the bending strain is released.

One interesting property of CNTs is the cold field emission of electrons. The cold field emission properties of CNTs are attributed to the fact that their aspect ratio (length to diameter) is very high. In addition, the presence of a high concentration of defects modify the electrical resistance and field emission properties of CNTs. Common defects in CNTs include vacancies and non hexagonal carbon rings. The specific combination of such defects may lead to the formation of nanotube junctions and branched nanotubes. These can be present in as-grown CNTs, but controlling their density externally opens a path towards the tuning of the field emission characteristics of the nanotubes.

Additionally, carbon nanotubes (CNTs) are generally formed in a forest type structure in which the tubes are entangled with one another due to Van der Waal forces. These structures can become difficult/impossible to use for a variety of applications due to their inherent structural complexities.

BRIEF DESCRIPTION OF THE DRAWINGS

Features are shown in the drawings, in which like reference numerals designate like elements.

DETAILED DESCRIPTION

Figure 1:
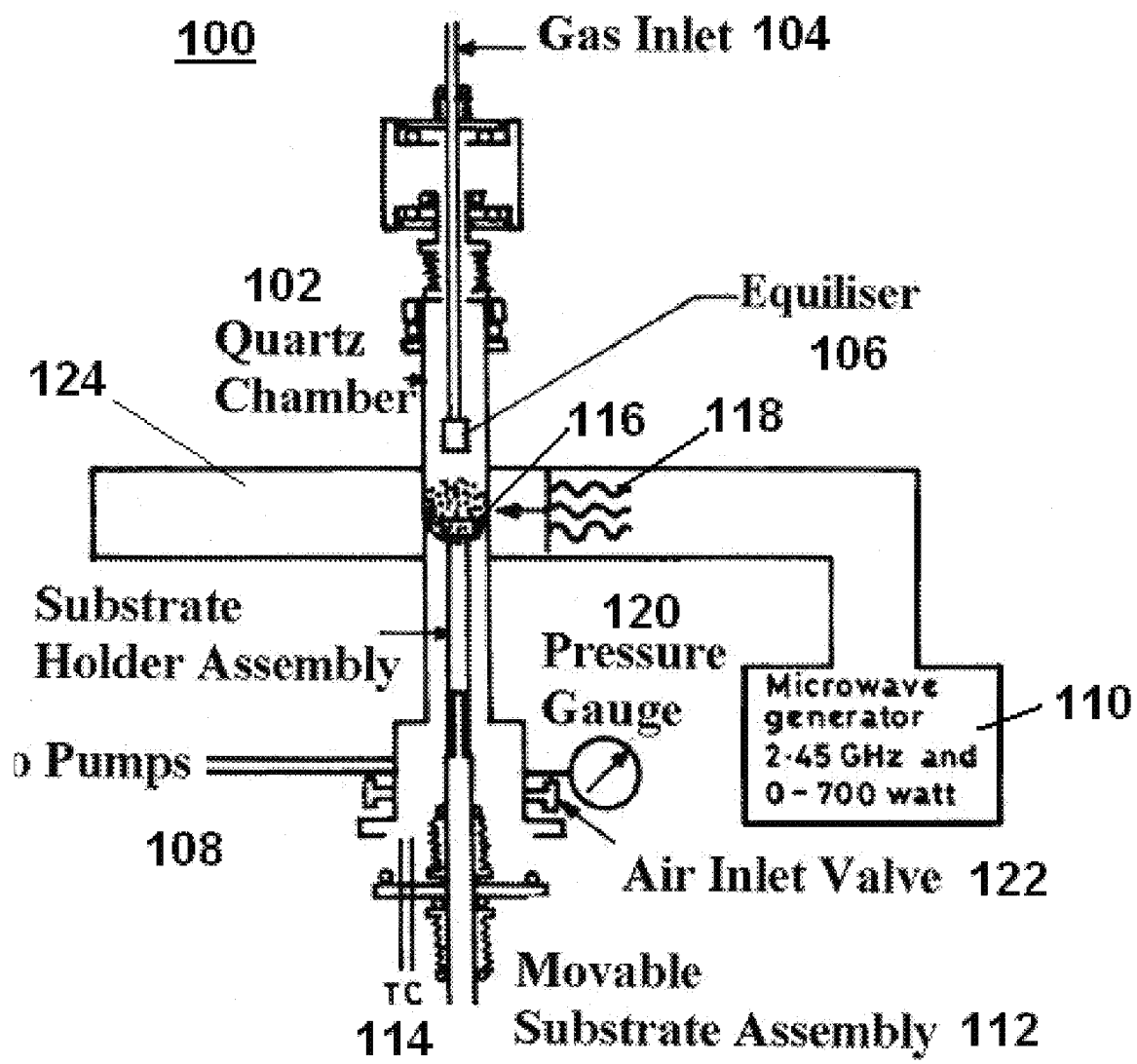
FIG. 1 is a schematic diagram of a plasma chemical vapor deposition apparatus used in an example embodiment of the method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Making oriented SWNTS is difficult. To do so with current techniques would entail a complex process with substantial control over the catalyst. Typically, this would be done using expansive electron beam lithography or focused ions beam techniques. The instant application discloses example embodiments of methods in which pillars of CNTs are formed and then controlled etching is performed to form a well defined nano size tip at the apex of the pillar. The reduction of the emitter tip size to small dimensions (typically of the order of few nm) can enhance the electric field at the tip apex. The enhancement is due to the heavily convergent electric lines of force at the tip. In this way, carbon nanotubes can be enhanced. Nano size tips on the apex of the CNT pillars can also act as an excellent tip in atomic force microscopy (AFM) and scanning tunneling microscopy (STM). Thus, with CNTs made according to the embodiments discussed below, emitter devices can be fabricated which may have low dimensionality, high aspect ratio, high electrical conductivity, better current stability, longer lifetime and lower turn on voltage relative to current devices.

Sources of field emission are of interest for various applications. Individual CNTs may possess efficient emission properties. However the emission from CNT pillars and similar CNT hetrostructures can be inefficient due to entangled growth and screening from neighboring CNTs. Further, entangled growth results in complex structures which may be difficult to use for certain applications. Additionally, the CNT emission efficiency typically differs from sample to sample.

Screening is an electrostatic effect. When an electric field is applied on a number of CNTs aligned vertically, the total applied field will be distributed to each CNT tip. Thus the applied electric field per CNT tip is reduced. If instead of number of CNTs there is one vertically aligned CNT, the total electric field will be applied on a single CNT tip.

Typical chemical vapor deposition (CVD) techniques used to grow vertically aligned CNTs result in a forest of pillars (vertical CNTs) and a horizontally entangled mat-like CNT network. Further, present CVD methods cannot be easily scaled down/miniaturized to achieve very small tip sizes. Indeed, using normal low cost optical lithography and CVD growth, it is difficult to produce a tip diameter smaller than about 10 μm. With methods according to the following embodiments, in contrast, starting with 100 μm diameter Multi-Walled Carbon Nanotube (MWCNT) pillars, pillars having tip sizes<1 μm can be produced by etching with a $H_2/N_2$ plasma treatment using microwave plasma chemical vapor deposition (MPCVD).

Tips fabricated by example embodiments may be used in variety of applications including by not limited to: (1) miniaturization of medical devices (such as bio sensing, blood filtration devices etc.), (2) application in X-Ray tubes, microwave plasma sources, and electron guns such as SEM, TEM, PET guns etc., (3) portable flat panel displays that can be viewed in broad daylight unlike present LCD displays, and (4) a low cost approach to white LED sources which are presently expensive because of materials used such as GaN or AlGaN.

An embodiment relates to a method comprising patterning a substrate to form exposed regions of the substrate sized to deter entangled growth of carbon nanotubes thereon and growing vertically aligned carbon nanotubes on the exposed regions of the substrate. In one aspect, the method further comprises asymmetrically etching the carbon nanotubes. In another aspect, the coated substrate comprises a layer of chromium and a layer of gold. In another aspect, the substrate comprises silicon. In another aspect, asymmetrically etching is conducted for 5 to 55 seconds. In another aspect, the asymmetric etching forms sharpened tips on the carbon nanotubes.

In another aspect, the carbon nanotubes are multiwalled. In another aspect, asymmetric etching comprises exposing the carbon nanotubes to a plasma. In another aspect, the plasma comprises hydrogen and nitrogen gases. In another aspect, the ratio of hydrogen to nitrogen varies in the range of to 4:1. In another aspect, etching is conducted from 10-60 seconds.

Another embodiment relates to a device comprising a substrate; and a pattern of vertically aligned carbon nanotubes on the substrate, wherein the vertically aligned carbon nanotubes are substantially non-entangled. In one aspect, when the carbon nanotubes are configured as field emitters, the turn on field for an etched tip is less than half of the turn on field for an unetched tip. In another aspect, the carbon nanotubes have an electric field enhancement factor greater than 15,000. In another aspect, the maximum emission current is greater than 3 A/cm$^2$. In another aspect, the vertically aligned carbon nanotubes are located in regions patterned in a metal layer on the substrate, the regions sized to deter tangling of carbon nanotubes. In another aspect, the electric filed enhancement factor of the etched carbon nanotubes is more than two times greater than the carbon nanotubes prior to etching.

An embodiment relates to an apparatus comprising a structure comprising a substrate and an array of vertically aligned carbon nanotubes on the substrate, wherein the vertically aligned carbon nanotubes are located in regions patterned in the substrate, the regions sized to deter tangles of carbon nanotubes. In another aspect, the apparatus is selected from the group consisting of X-Ray tubes, microwave plasma sources, display screens, SEM, TEM, and PET guns. In another aspect, the carbon nanotubes are multiwalled and have sharpened tips having a diameter less than 500 nm.

An embodiment includes a method comprising steps growing of vertically aligned solid cylindrical carbon nanotube bundles of MWCNTs followed by plasma processing MWCNT bundles. In one aspect of the process, an oxidized Si substrate is initially coated with a chrome-gold layer. Because gold does not bond well to SiO$_2$, chrome can be used to get better attachment between the SiO$_2$ and the gold. Further, gold is used in this embodiment to promote selective growth of CNTs. Selective growth of CNTs can be achieved with gold because CNTs do not grow on gold under appropriately selected growth conditions. For example, if sputtering is used for the deposition of chrome-gold layer, the substrate may be held at room temperature (typically 288-303K (15-30° C.)) and the sputtering chamber reduced to a base pressure between 5×10$^{-5}$-8×10$^{-5}$ mbar. Sputtering may then be conducted at a working pressure-1×10$^{-2}$ mbar. In one aspect, a Cr layer having a thickness of 20 nm and a layer Au of 65 nm may be deposited.

In an embodiment, the gold-chrome layers may be patterned by optical lithography. In those areas where it is desired to grow the CNTs, the gold is removed to uncover the substrate. In those areas where CNT growth is not desired, the gold layer is left untouched. A pattern of any shape, size, and type may be obtained depending on the application or end use. Other lithography methods, such as microwave, x-ray, and electron beam lithography may also be used. However, if the base features of the patterns are relatively large (e.g., 100 μm circles), x-ray or e-beam photo lithography is not needed. In some embodiments, the initial bundle footprint may be micron sized yet the tip ends up having a nanometer size.

In an embodiment, to sharpen the vertical aligned bundles of CNTs into nanometer size tips, a plasma treatment using nitrogen and hydrogen plasma has been developed. Samples prepared as above may be subjected to a plasma of a mixture of N$_2$ and H$_2$ in a vacuum chamber. In one aspect the plasma reactor may be operated using microwaves of 2.45 GHz and 300 W power. Other frequencies and powers may be used. For example, to create the plasma the power may maintained between 300-400 W at a pressure range between 10-20 torr. In one aspect, the temperature during the plasma processing is 600° C. and the pressure approximately 10-20 torr. Other temperatures and pressure, however, may be used. For example, etching may be accomplished at temperatures as low as 400° C. The etching rate at lower temperatures, however, is slower. That is, etching may be performed in a temperature range of 400-650° C. For faster etching a range of 500-650° C. may be used. At temperature higher than 650° C., etching becomes rapid and difficult to control.

I. Example

In this example, a [100] oriented p-type Si substrate of approximately 2 inches diameter was subjected to standard RCA cleaning Substrates of other orientations, such as [111] however, may also be used. Further, n-type Si wafers may also be used. Indeed, substrate materials other than silicon may used. In this embodiment, a silicon substrate was selected because CNTs grow well on SiO$_2$ under the selected experimental conditions and also because Cr—Au has a good adhesion with SiO$_2$.

After RCA cleaning, the substrate was wet oxidized for 30 minutes to form SiO$_2$ layer of approximately 50 nm at the top surface of the substrate. The thickness of the SiO$_2$ layer, however, may be varied from 40-60 nm. Generally, if the oxide layer is thinner than 40 nm, the wafer will not oxidize homogeneously. Larger thicknesses then 60 nm of SiO$_2$ generally results in a larger insulation barrier for field emission applications.

After cleaning and oxidizing, a layer of chrome-gold (Cr—Au) was deposited onto the silicon substrate by DC sputtering. Other deposition methods may be used. The thickness of the Cr and Au were 20 nm and 65 nm, respectively. The deposition temperature of Cr—Au was 300 K. That is, the substrate was generally kept at a temperature of 300K. The Cr and Au were sputtered from their respective targets. The base deposition pressure in the system was on the order of 10$^{-5}$ mbar, specifically 5×10$^{-6}$ to 8×10$^{-6}$ mbar. Pressures of 1×10$^{-5}$ to 8×10$^{-5}$ mbar may be used.

A photographic mask was then designed using a popular CAD/CAE tool. For pillars with 100 micron diameter, the height of the pillar in this example experiment may be between 100-250 microns. Thus, the separation between pillars may be >250 micron so that the pillars stand separately. That is, so that the pillars do not touch if a pillar grows in a non-vertical direction. In the same manner, for smaller diameter pillars, the separation limitation may be less. The mask was designed to produce circular openings in the chrome-gold layer. Other shapes may be patterned.

The wafer was then dehydrated. Dehydration may be performed at a temperature range between 363-383K (90-110° C.) and for times between 40-50 min. After dehydration of the wafer at 383 K (110° C.) for 45 min, a positive photo-resist was coated on the Au—Cr layer using a spin-coating technique. In alternative embodiments, a negative photo-resist may be used. Spinning was conducted at a rate of 1000 rpm for 1$^{st}$ 5 seconds and then 3000 rpm for 50 seconds. The mask was aligned on the silicon substrate and exposed to UV radiation. Subsequently by chemical etching of Cr and Au ($I_2$:KI:$H_2O$=1:2:10) the desired pattern was formed on the substrate.

By using the above process, a silicon substrate was produced having a periodic pattern of 100 μm diameter circles with column and row separation of 250 μm on which the growth of nanotubes was performed. A 1 cm×1 cm piece of the patterned substrate was taken to carry the growth of CNTs in a thermal chemical vapor deposition (CVD) apparatus. A liquid mixture of ferrocene and toluene (0.02 gm/ml) as carbon sources as well as a source of floating catalyst of Fe was placed in the CVD apparatus. Other carbon sources that may be used include, but are not limited to, Xilen, Benzen, and Aceteline. Other catalysts that may be used include, but are not limited to, Nicolocine and Cobaltocine. Hydrogen was used as carrier gas. Other carrier gases such as argon and helium may also be used. Growth was conducted at a temperature of 850° C. Growth, however, may be performed in a temperature range of 1023-1123K (750-850° C.

The liquid mixture was poured into the inlet (the inlet temperature was approximately 373K (120° C.)) of a quartz tube furnace after the substrate had reached the growth temperature. The liquid vapors were carried by the $H_2$ carrier gas (flow rate approximately 70 SCCM) into the furnace. Deposition was performed for 25 minutes resulting in CNTs pillar lengths of approximately 150 μm. Typically, the average height of the pillars varies from 150-250 μm for 25-30 min deposition. This height range has been found suitable for 100 μm diameter CNT pillars to stand straight vertically aligned and remain well separated from each other.

The nanotubes grown according to the above condition tend to grow vertically aligned. Entanglement of the nanotubes, however may be an issue for certain specific applications. That is, although the CNTs may be vertically aligned, they may not be isolated. The CNTs may be entangled with the neighboring CNT forest. For fluidic flow applications, entanglement is not an issue as the fluid tends to travel through the cylindrical channels within the CNTs from one end to the other. But for other applications, such as field emitters, the entanglement may affect the efficiency of the emitter. This is because, the forest of CNTs produce a screening effect on the field emission. The problem of entanglement may be addressed by using a plasma treatment as discussed below.

In an example embodiment, the plasma treatment of pillars as grown above may be carried out using microwave plasma CVD (MPCVD) inside a quartz chamber evacuated to a base pressure of $10^{-2}$ mbar. Typically, the pressure is maintained between $1\times10^{-2}$ mbar to $5\times10^{-2}$ mbar.

A schematic diagram of a MPCVD system 100 is shown in FIG. 1. The MPCVD system 100 includes a deposition chamber 102 which may, for example, be made of quartz. Gases, including reactive and inert carrier gases, can be introduced into the deposition chamber 102 via a gas inlet 104. Optionally, the MPCVD system 100 can include an equilizer 106 which distributes the gases in the same way a shower head distributes water out of a shower pipe. The MPCVD system also includes a gas outlet 108. The gas outlet 108 may be connected to pumps (not shown) which can be used to evacuate air and other gases from the deposition chamber 102. Pressure in the MPCVD system 100 may be monitored with one or more pressure gauges 120 while the temperature may be monitored with a thermocouple 114. At the end of an experiment, air may be allowed into the MPCVD system via an air inlet valve 122.

The MPCVD system 100 also includes a microwave generator 110. In an embodiment, the microwave generator 110 is operated at a frequency of approximately 2.45 GHz. The microwave generator 110, however may be operated at other wavelengths. In an embodiment, the microwave generator 110 may operate at a power of 300 watts. The microwave generator, however, may operate at other power levels, for example 0-700 watts. The MPCVD system 100 may also include a movable substrate assembly 112. The moveable substrate assembly 112 allows for easy loading and unloading of a sample into and out of the deposition chamber 102. The samples (substrates) may be placed on a graphite holder 116 (graphite may be used to avoid interference with the microwave propagation). The deposition chamber 102 may be located inside a waveguide 124, forming a downstream plasma source 118. In one aspect, the maximum of the microwave field is formed at the center of the deposition chamber 102.

The as-grown CNT pillar array may be treated in a mixture of hydrogen and nitrogen ($H_2$+$N_2$) plasma generated by microwave power. Other gas mixtures may also be used. The CNTs were treated using 6N purity $H_2$ and $N_2$ at flow rates of 40 and 10 SCCM, respectively. The flow rate of $H_2$, however, may be in the range of 40-45 SCCM and the flow rate of $N_2$ in the range of 10-15 SCCM. The plasma treatment may be performed in a temperature range of 737-923K (500-650° C.) and for a time range of 10-60 seconds.

The microwave energy was pumped into the reaction chamber and the temperature of the sample was adjusted to about 873K (600° C.). The treatment time was varied from 10-60 seconds at 10-20 torr chamber pressure. Due to the asymmetric nature of the etching, the structures of the desired shape, size and type of field emitter tips were formed on the silicon substrate. The sharpest tip were formed after a 35 sec plasma treatment as illustrated in Table 1 below.

TABLE 1

| Plasma Treatment Time (sec) | Pillar Height (μm) | Tip diameter (μm) |
| --- | --- | --- |
| 0 | 150 | 100 |
| 15 | 150-148 | 24-26 |
| 25 | 140-144 | 5-8 |
| 35 | 128-135 | <1 |
| 45 | 86-90 | 3-6 |
| 55 | 60-65 | 10-12 |

Figure 2:
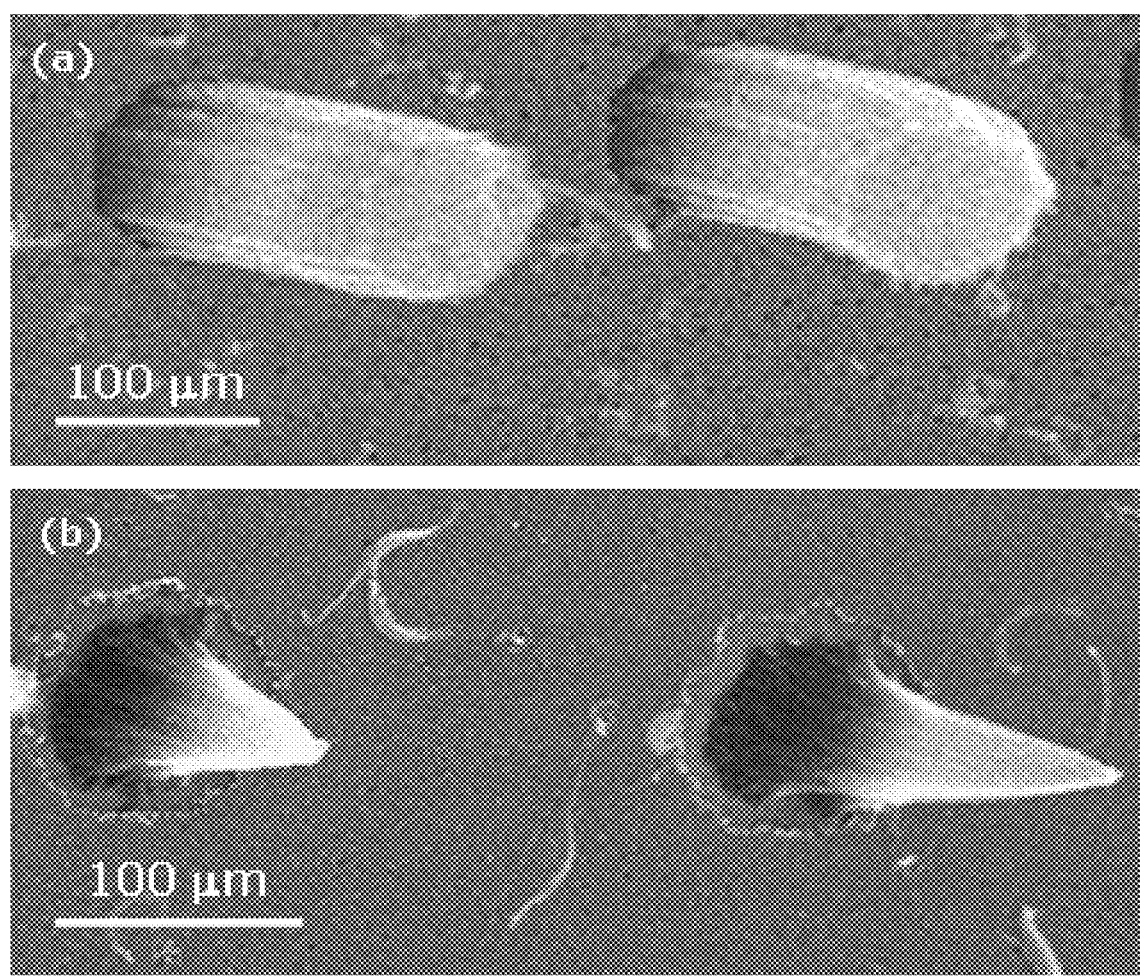
FIG. 2 illustrates SEM micrographs of (a) as-grown CNT pillar and (b) after $H_2+N_2$ plasma treatment for 35 s.

FIG. 2 illustrates SEM micrographs of (a) an as grown example CNT pillar and (b) the as grown example CNT pillar after $H_2$+$N_2$ plasma treatment for 35 s. As can be seen the figure, the aspect ratio of the tip increases due to the sharpening the CNT pillars. Thus, when an electric field is applied on the nano-size tips, the screening effect is reduced. This results in an increase in the enhancement factor of the electric field at the tip, which results in improvement in field emission characteristics.

Figure 3:
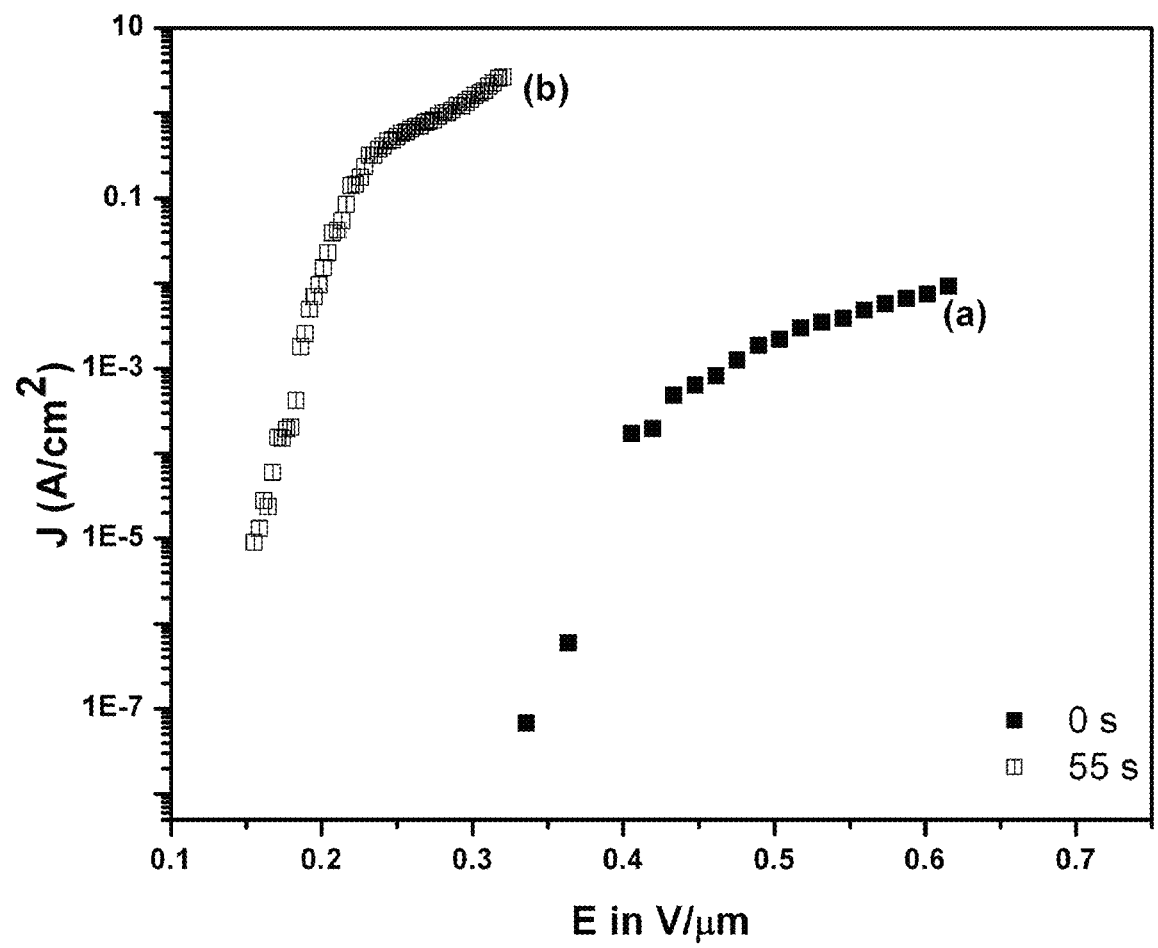
FIG. 3 illustrates field emission characteristics for the as grown CNT pillars and for 35 s plasma treated emitter tips.
Figure 4:
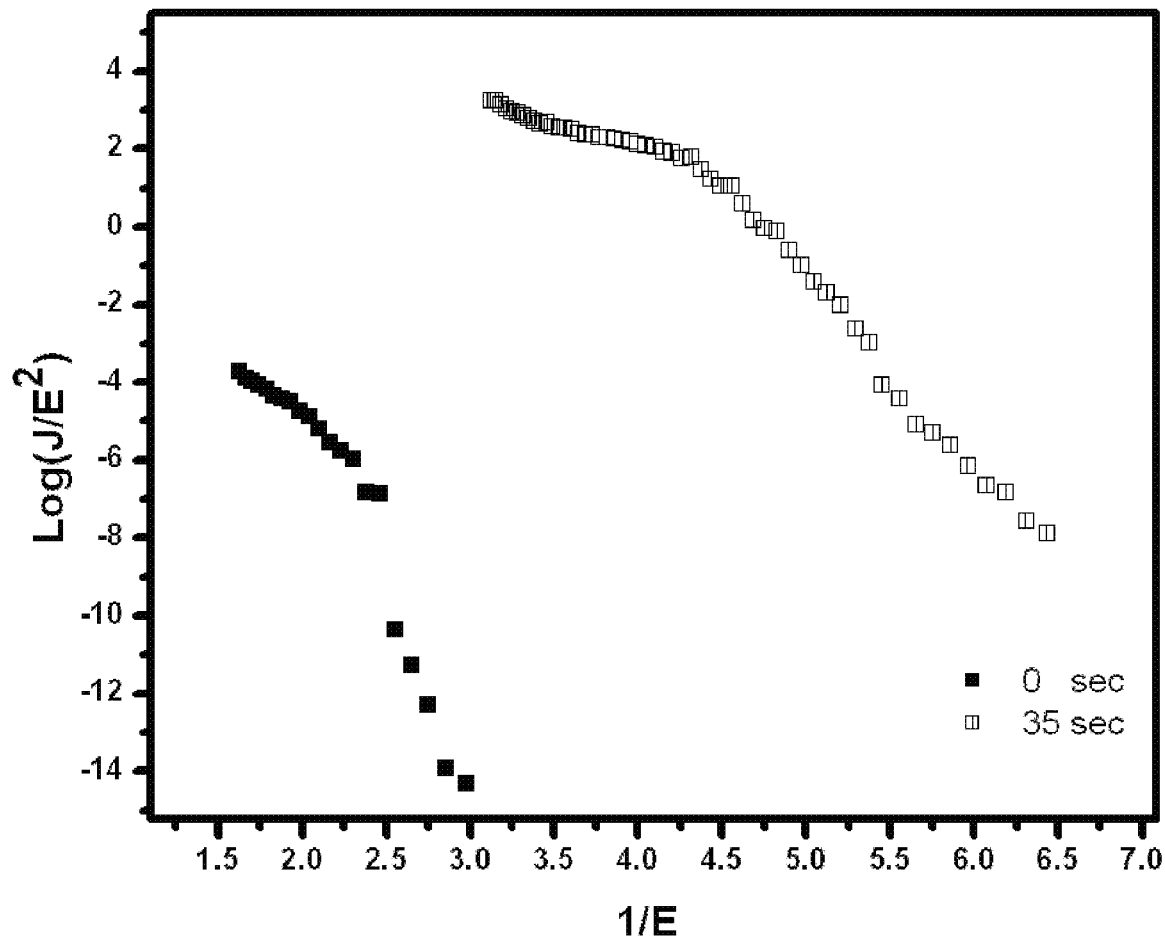
FIG. 4 is a Fowler-Nordhiem plot of the untreated (0 s) and 30 s plasma treated samples.

FIG. 3 illustrates the field emission characteristics for the as-grown example CNT pillars and for the 35 s plasma treated emitter tips. Conventional emission analysis shows that the electric field enhancement factor for high field region is enhanced from 5960 to 16600 after 35 s plasma treatment. According to Fowler-Nordhiem (F-N) equation the field emission current density (J) is given by $$J = \frac{a(\beta E)^2}{\phi} \exp\left(\frac{-b\phi^{3/2}}{\beta E}\right)$$

where E is the electric field at the apex of the tip in V/μm, φ is the work function (~5 eV), and $a=1.56\times10^{-6}$ $AV^{-2}$ eV and $b=6.83\times10^{7}$ $eV^{-3/2}$ $Vcm^{-1}$, are constants. The Field enhancement factor (β) is calculated from the slope of the curve $Log(J/E^2)$ vs. 1/E, known as F-N plot.

With the sharpest emitter tips, a turn-on field (defined for an emission current density of 10 μA/cm²) of ≅0.16 V/μm was achieved. This is the lowest turn on field currently reported for field emitters. Further, with the present emitter tips, a maximum emission current density of approximately 3 A/cm² was achieved for a 0.32 V/μm applied electric field.

This level of field emission offers potential for applications in high performance SEM, TEM, PET guns, X-ray tubes etc. Due to the large area processing ability (processing entire wafers), the disclosed embodiment may also be useful for fabricating high brightness daylight viewable flat panel displays. Further, the manipulation of tip size to get truly nanometer tips is a promising technique for AFM tip processing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    patterning a substrate to form exposed regions of the substrate sized to deter entangled growth of carbon nanotubes thereon;
    growing vertically aligned carbon nanotubes on the exposed regions of the substrate; and
    asymmetrically etching the carbon nanotubes, wherein asymmetrically etching the carbon nanotubes comprises exposing the carbon nanotubes to a plasma.

2. The method of claim 1, wherein the coated substrate comprises a layer of chromium and a layer of gold.

3. The method of claim 2, wherein the substrate comprises silicon.

4. The method of claim 1, wherein asymmetrically etching is conducted for about 5 to 60 seconds.

5. The method of claim 1, wherein the asymmetric etching forms sharpened tips on the carbon nanotubes.

6. The method of claim 1, wherein the carbon nanotubes are multiwalled.

7. The method of claim 1, wherein the plasma comprises hydrogen and nitrogen.

8. An apparatus comprising:
a substrate;
a plurality of metal-catalyst regions patterned on the substrate, wherein the plurality of metal catalyst regions are spaced at least about 250 μm apart; and
a plurality of pillars, each pillar disposed on one of the plurality of metal-catalyst regions, wherein the pillars each comprise vertically aligned carbon nanotubes, and wherein the pillars each further comprise a plasma-etched tip on an end of the pillars opposite the substrate.

9. The apparatus of claim 8, wherein the pillars each comprise a tip on an end of the pillars opposite the substrate, wherein the tip diameter is less than about 26 μm.

10. The apparatus of claim 8, wherein the metal-catalyst comprises Cr, Ni, or Co.

11. A method comprising:
providing a patterned substrate comprising a plurality of metal-catalyst regions;
exposing the metal-catalyst regions to a carbon source gas to form pillars on the plurality of metal-catalyst regions, wherein the pillars comprise carbon nanotubes; and
exposing the pillars to plasma to at least partially etch tips of the pillars, wherein the tips are on an end of the pillars opposite the patterned substrate.

12. The method of claim 11, wherein the pillars are exposed to plasma for about 5 seconds to about 60 seconds at a temperature of about 500° C. to about 650° C.

13. The method of claim 11, wherein the carbon nanotubes are multi-walled carbon nanotubes.

14. The method of claim 11, wherein the metal-catalyst comprises Cr, Ni, or Co.

15. The method of claim 11, wherein the pillars are spaced at least about 250 μm apart.

16. The method of claim 11, wherein the pillars are substantially vertically aligned.

17. The method of claim 11, wherein the pillars have a height of about 60 μm to about 250 μm.

18. The method of claim 11, wherein the tips have a diameter less than about 26 μm.

19. The apparatus of claim 8, wherein the pillars have a height in a range of about 100 μm to about 250 μm.

20. The apparatus of claim 8, wherein the carbon nanotubes are multi-walled carbon nanotubes.

* * * * *

UNITED STATES PATENT AND TRADEMARK OFFICE
CERTIFICATE OF CORRECTION

PATENT NO. : 8,198,794 B2
APPLICATION NO. : 12/842020
DATED : June 12, 2012
INVENTOR(S) : Misra et al.

It is certified that error appears in the above-identified patent and that said Letters Patent is hereby corrected as shown below:

On the Title Page, in Field (56), under "OTHER PUBLICATIONS", in Column 2, Line 8, delete "Tempurature" and insert -- Temperature --, therefor.

On the Title Page, in the Figure, delete "Equiliser 106" and insert -- Equalizer 106 --, therefor.

In Fig. 1, Sheet 1 of 4, delete "Equiliser 106" and insert -- Equalizer 106 --, therefor.

In Column 1, Line 7, delete "CNT's" and insert -- CNTs --, therefor.

In Column 1, Line 54, delete "Nordhiem" and insert -- Nordheim --, therefor.

In Column 2, Line 29, delete "hetrostructures" and insert -- heterostructures --, therefor.

In Column 4, Line 24, delete "cleaning" and insert -- cleaning. --, therefor.

In Column 5, Lines 12-13, delete "Xilen, Benzen, and Aceteline." and insert -- Xilene, Benzene, and Acetylene. --, therefor.

In Column 5, Line 18, delete "C." and insert -- C.) --, therefor.

In Column 6, Line 60, delete "Nordhiem" and insert -- Nordheim --, therefor.

Signed and Sealed this
Twenty-fifth Day of September, 2012

David J. Kappos
*Director of the United States Patent and Trademark Office*